United States Patent [19]
Selway

[11] Patent Number: 5,253,952
[45] Date of Patent: Oct. 19, 1993

[54] STABILIZER FOR UNDERGROUND VALVE HOUSING

[76] Inventor: Bruce W. Selway, 617 W. College, Jacksonville, Ill. 62650

[21] Appl. No.: 884,377

[22] Filed: May 18, 1992

[51] Int. Cl.⁵ ............................................. E01F 5/00
[52] U.S. Cl. ..................................... 404/25; 239/201; 404/2
[58] Field of Search ............... 404/25, 26, 2; 405/36; 239/201, 203; 166/81

[56] References Cited

U.S. PATENT DOCUMENTS

| | | | |
|---|---|---|---|
| D. 256,386 | 8/1980 | Bergland | D23/7 |
| 1,105,993 | 8/1914 | Munson | 239/201 X |
| 2,080,341 | 5/1937 | Schumacher | 239/201 |
| 3,265,310 | 8/1966 | Cohen | 239/203 X |
| 3,343,796 | 9/1967 | Trickey | 239/201 |
| 4,475,844 | 10/1984 | Arntyr et al. | 404/25 X |
| 4,673,034 | 6/1987 | Hansen | 166/81 |

FOREIGN PATENT DOCUMENTS

| | | | |
|---|---|---|---|
| 130784 | 8/1919 | United Kingdom | 404/25 |
| 1552406 | 9/1979 | United Kingdom | 404/25 |

Primary Examiner—William P. Neuder
Attorney, Agent, or Firm—Joseph W. Holloway

[57] ABSTRACT

A ground engaging hollow, disklike support mounted coaxially about the top end of the upper section of an underground valve box and having a conical top wall which sheds water to the outer edge of the disk to prevent softening and erosion of ground under the disklike support leading to vertical destabilization of the valve box.

10 Claims, 2 Drawing Sheets

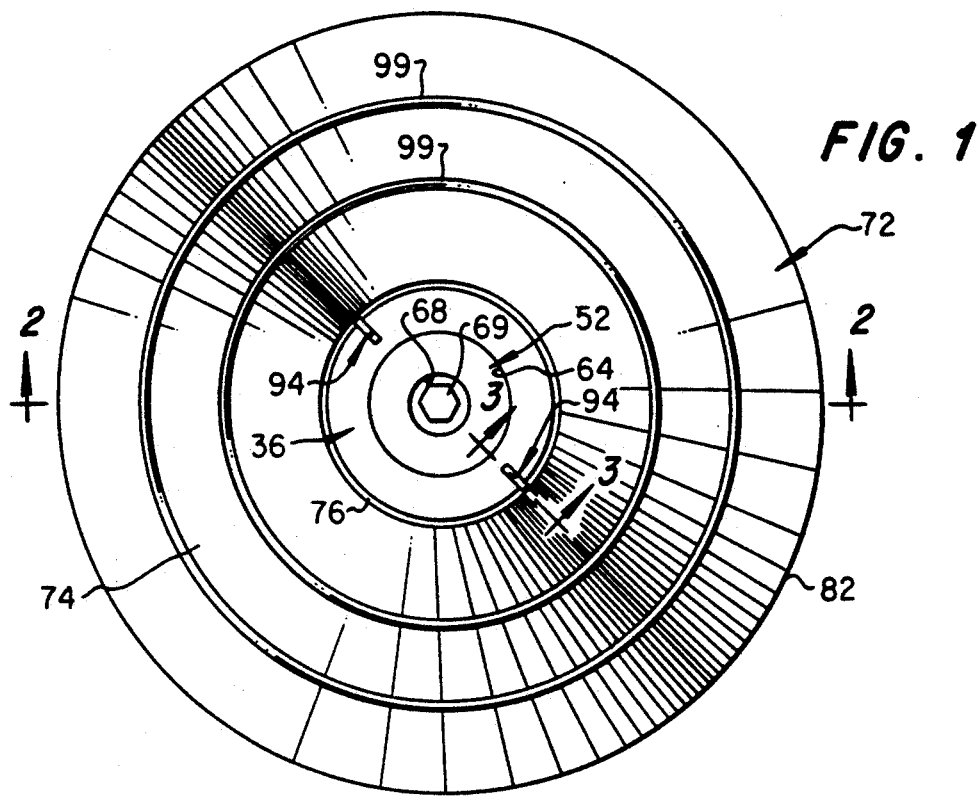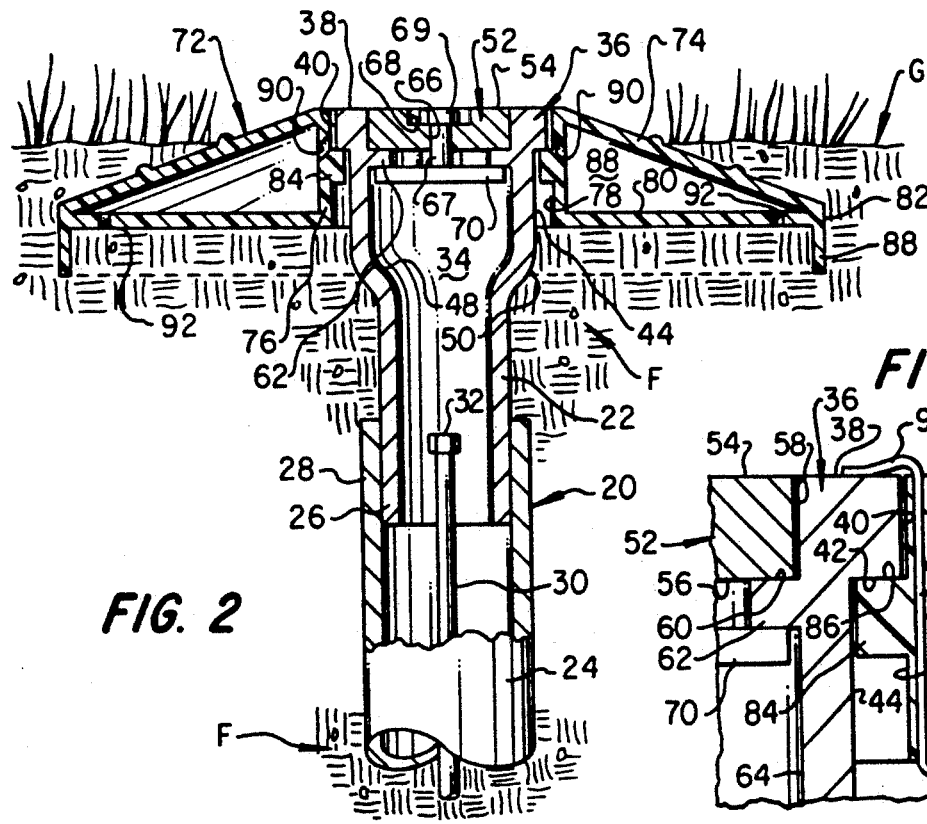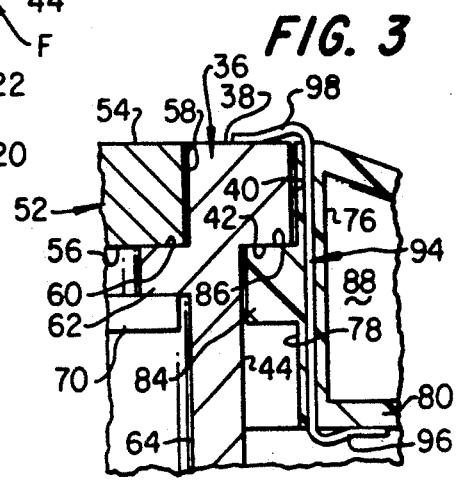

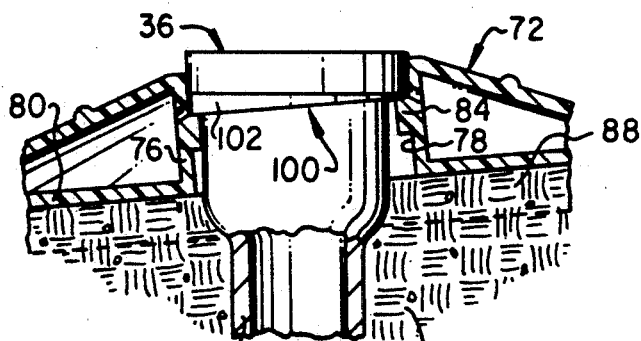
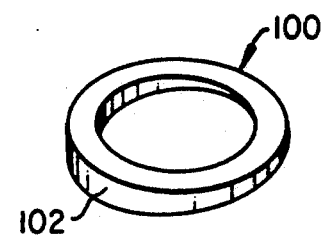
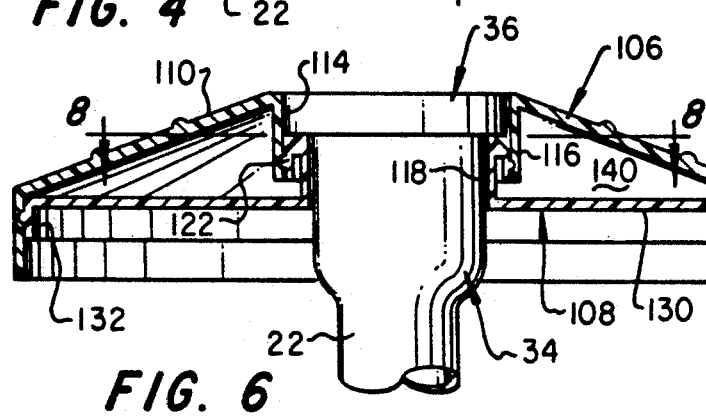
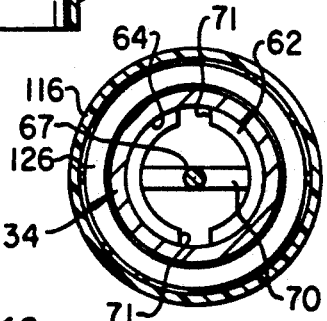
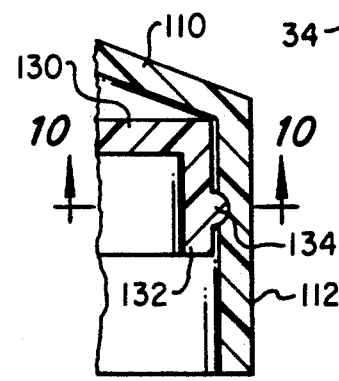
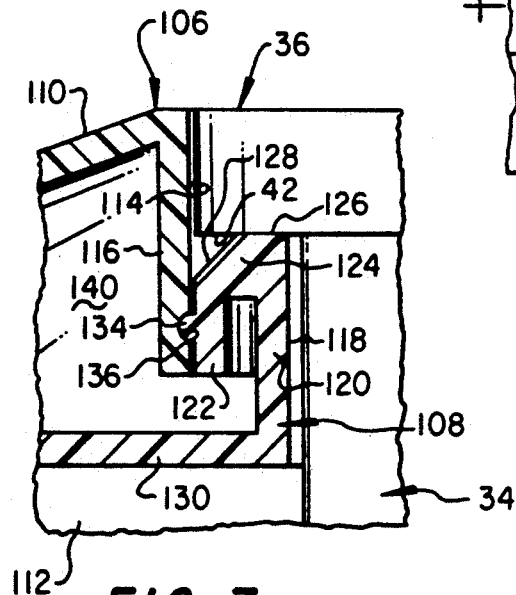
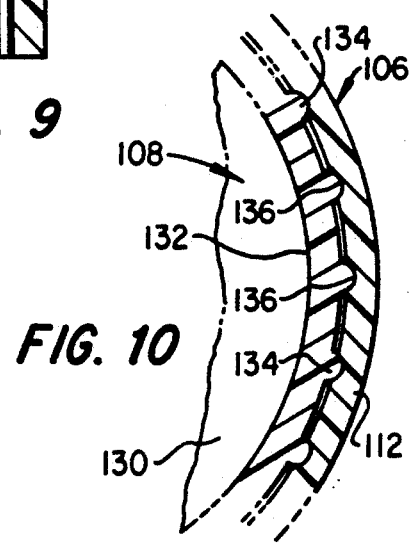

STABILIZER FOR UNDERGROUND VALVE HOUSING

BACKGROUND OF THE INVENTION

This invention relates generally to an improved device for stabilizing the upper member of a plural-part housing for an underground shut-off valve.

The control valve associated with a branch line serving an individual gas or water consumer is commonly buried substantially below ground level proximate the main supplying the branch line. Access from ground level to such a valve may be had through a hollow housing or box surrounding the valve by means of a hand-operated rod insertable downwardly through the housing for engaging a valve operating member.

A common type of valve housing is characterized by discrete upper and lower tubular sections which are axially movable in a telescopic manner. While the primary function of the two-part housing is to provide access to an underground valve, its other important functions are to provide for easy adjustment of its top-to-bottom length and to isolate the lower housing section from any downward axial movement of the upper housing section after installation of the housing in the ground. It is contemplated that, as the housing is installed, the lower section will bear directly upon the main or some exterior surface of the valve itself; the upper section will telescope either inside or outside the lower member; and, the overall axial length of the telescoped sections will be adjusted so that the top end of the upper section and the access lid carried thereby will be at or very near ground level.

As typically constructed, the top portion of the upper member of a plural-part tubular housing is configured to have a radially enlarged head which terminates in a downwardly facing annular shoulder. As the excavation about the upper and lower sections is filled, this annular shoulder is underlain and supported by fill to establish the desired vertical position of the upper section. If a typical housing is installed in a street, sidewalk or driveway, a stable paving medium such as concrete or asphalt will surround the head formed on the upper section in vertically supporting relation thereto. On the other hand, should a housing be installed in a parkway or lawn area, vertical support for the upper section is provided solely by earth or other relatively unstable fill compressively embracing its outer cylindrical wall and underlying the aforementioned annular shoulder.

A longstanding problem is created when rain water, melt water or moisture from other sources softens, erodes or otherwise destabilizes the fill embedding the upper housing section. In this situation, the upper section of the housing is likely to settle in the moistened fill under its own weight or due, perhaps, to some casual force applied to the top of the housing or to the access lid carried thereby. In aggravated occurrences of fill destabilization, the upper section may be displaced downwardly to such an extent that its top surface as well as the access lid are situated well below ground level. Thereafter, pooling of water in the crater formed around the upper section accelerates erosion and exacerbates the sinking problem. Moreover, once the upper section sinks below ground level, its top end may become overlain with enough earth to support vegetative growth which thrives due to favorable conditions for composting of leaves and grass clippings trapped in the depression formed about the sunken valve housing.

When the upper housing sinks and becomes obscured by earth, vegetation or both, visual location of the access lid becomes difficult if not impossible. The time expended by utility company personnel to locate, clear and remove such a fouled access lid is obviously increased. Even greater cost and customer inconvenience are involved in excavating and repositioning a sunken valve housing. Dangerous, perhaps deadly, consequences arise in case an access lid for a gas valve in a branch line serving a burning structure cannot be quickly located by utility company personnel or firefighters.

If a single-piece valve housing is substituted for a telescopic housing to forestall sinking of its access lid, erosion about the upper end of the housing and creation of a crater therearound may result in projection of the upper end of the housing above the adjacent terrain. Also, in accordance with the teaching of the prior art, the upper segment of a two-part housing could include a radially projecting flange or the like adjacent its underground end to provide vertical support should the fill be eroded away about the housing's upper end. In either case, the resulting above-ground projection of a valve housing has potential for personal injury and catastrophic damage to power-driven lawn care equipment.

The somewhat pertinent U.S. Pat. No. 4,475,844 issued to Arntyr et al shows a tubular drain pipe vertically positioned in the ground with a tubular neck of an overlying drain cover telescopically received in the top of the drain pipe. An annular support is coaxially seated upon the extreme upper end of the drain pipe and has a flange which extends radially from the top of the drain pipe a substantial distance. The entire flanged support is buried or anchored in the ground some distance below the drain cover. The stated purposes of the disclosed support are as follows:

1. The support flange improves the vertical supporting ability of the material (earth) immediately underlying the drain cover.
2. The support flange will deflect ground water radially away from the drain pipe to prevent softening of the ground layer surrounding the same.
3. If the exposed surface surrounding the drain cover should sink, the flange will be pressed downwardly against the top of the drain pipe to prevent any tendency of the drain pipe to heave upwardly.
4. In the case of light weight plastic drain pipes, the flanged support will be pressed downwardly by overlying earth against the upper end of the drain pipe to prevent its upward movement due to geostatic pressure.

While placement of the water-deflecting flange underground and below the drain cover is required for carrying out all the multiple purposes of the Arntyr et al invention, such placement of this type of support is not appropriate or useful in addressing the long standing valve housing problem outlined above. Destabilization of the upper housing section due to water entering around its exposed top end will not be prevented by a water-deflecting flange buried deep enough to rest upon the extreme upper end of the lower section of a two-part housing. Rather, what is required is a water-deflecting means which directs water away from the ground surface area surrounding the upper section thereby preventing softening and erosion of the fill that vertically supports the upper section.

SUMMARY OF THE INVENTION

The aforenoted problems and shortcomings of prior art housings for underground valves are substantially obviated by the present invention which provides an improved groundengaging disklike support mounted coaxially about the top end of the upper section of a conventional plural-part housing. The central opening of the disklike support has a radially extending flange which provides a seat for a flange projecting radially outwardly from the enlarged head of an upper housing section. When the upper section is fully inserted axially downwardly through the central disk opening, these flanges engage in abutting fashion whereby the upper section is effectively suspended by the disk; and, theextreme top surfaces of the upper section and an access lid carried thereby are in substantial registration with an upwardly facing surface of the disk. In this assembled condition, fill is tamped beneath the entire undersurface of the disk and around the upper housing section to maintain both the disk and the upper section in prescribed relation to ground level so that the access lid and the surrounding disk top surface remain visible.

In the manner of an umbrella, the disk's top wall slopes outwardly and downwardly about the top end of the upper housing section and serves to shed water to the outer circumferential edge of the disk. Deflection of water away from the outer tubular wall of the upper housing and away from its annular shoulder underlain by supporting fill substantially eliminates the problems of fill softening and erosion leading to sinking of the upper housing section below ground level.

Another object of this invention is to provide a hollow, centrally apertured discoid having a conical top wall and a planar base wall joined at their out peripheral edges and defining therebetween a substantially closed cavity.

Yet another object is to provide a hollow disk having a annular skirt depending about its outer peripheral edge to prevent reentry of deflected water under the base of the disk into the fill underlying the disk.

Still another object is to provide an umbrella-like disk which closely surrounds and supports the top of a valve housing wherein the disk has a hollow interior and connecting internal passages providing drains for any water entering between the disk and the housing. Such drain passages empty to the underside of the disk into that area of the underlying fill radially remote from the depending tubular body of the housing penetrating the center of the disk.

A still more detailed object is to provide a hollow disk of either a unitary or a two-piece construction both being molded of a suitably strong but inexpensive and lightweight plastic material.

Another specific object is achieved in a disk having an auxiliary wedging annulus insertable between the disk and the valve housing for tilting the disk with respect to the longitudinal centerline of the tubular valve housing surrounded by the disk. Through use of such a wedging device, the present invention can be employed to advantage with a valve housing installed in sloping terrain.

Still another detailed object is to provide a ground-supported stabilizer comprising a hollow body having a low vertical profile defined by an exposed upper wall that flexes downwardly when trod upon or when overridden by the wheel of a lawnmower or the like. Such flexing of the upper disk wall tends to cushion such forces thereby preventing, or at least reducing, compaction and downward displacement of the fill under the disk.

An ancillary object of this invention is to provide a simple means for securing the disk about the top of the upper section of the valve housing in fixed axial relation thereto to facilitate placement of fill under the disk during installation of the valve housing assembly.

These and other advantages and objects of this invention and the manner of obtaining them will become apparent and the invention will be best appreciated and fully understood by having reference to the following detailed description of the embodiments of the invention taken in conjunction with the accompanying drawings.

DESCRIPTION OF THE DRAWINGS

FIG. 1 is a top plan view;

FIG. 2 is a sectional view taken generally along lines 2—2 of FIG. 1 illustrating the invention in its installed condition;

FIG. 3 is a sectional view taken generally along lines 3—3 of FIG. 1;

FIG. 4 is a partial sectional view showing an annular wedge in assembled condition;

FIG. 5 is a perspective view of the annular wedge shown in FIG. 4;

FIG. 6 is a sectional view similar to FIG. 2 showing an an alternate embodiment of the invention;

FIG. 7 is an enlarged fragment of the embodiment shown in FIG. 6;

FIG. 8 is a section taken along lines 8—8 of FIG. 6;

FIG. 9 is an enlarged fragment of the embodiment shown in FIG. 6; and,

FIG. 10 is a section taken generally along lines 10—10 of FIG. 9.

DETAILED DESCRIPTION OF THE INVENTION

The conventionally constructed plural-part valve housing illustrated in FIG. 2 is denoted in its entirety by numeral 20. Upper and lower housing sections 22 and 24, respectively, are generally tubular with the bottom end 26 of section 22 being telescopically received within the top end 28 of lower section 24. In a well-understood manner, the bottom end of lower section 24 extends downwardly through earth or other surrounding fill F into bearing contact with an underlying main or branch line in surrounding relation with a shut-off valve, not shown. An operating handle 30 for the shut-off valve projects upwardly into the housing 20 so that its headed upper end 32 may be conveniently engaged and rotated by a suitable tool inserted downwardly through the top of the upper section 22.

As best shown in FIGS. 2 and 3, the top portion of the upper tubular section 22 comprises a bell-shaped head 34 terminating in a radially projecting flange 36 defined by an annular top surface 38, an outer cylindrical wall 40, and an annular bottom surface 42 which returns inwardly to intersect the outer head wall 44. The bottom of the head 34 is defined by a neck 48 which creates a transitional shoulder surface 50 connecting the outer head surface 44 to the nominally sized portion of the upper section 22. Coaxially contained within the head 34 is an access plate or lid 52 having upper and lower flat surfaces 54 and 56, respectively, connected by a cylindrical outer wall 58. The lower lid surface 56 is seated upon the upper surface 60 of a notched annular flange 62 projecting from the inner head wall 64; and, the flat upper surface 54 of the plate is in registration with the annular top surface 38 of the head 34.

The lid 52 has a centerbore 66 penetrated by a locking shaft 67; and, the centerbore has a counterbore 68 which receives the hexagonal head 69 of the shaft 67. To the depending end of the shaft 67 is fixed a crossbar 70 which may be rotated from above lid 52 to align its extending arms under the flange 62, as seen in FIGS. 2, 3 and 8, to secure the lid 52 in its assembled condition with respect to the upper section 22. A suitable tool may be applied to the shaft head 69 to rotate the crossbar 70 into alignment with angularly opposed notches 71 relieved in the flange 62 whereupon the lid 52, as well as the shaft 67 and cross bar 70, may be withdrawn from the upper section 22 to gain access to the shut-off valve handle 30.

Turning now to the description of the novel features of the present invention, a first embodiment thereof comprises the unitary disk illustrated in FIGS. 1 through 4 and generally designated by numeral 72. Also disclosed hereinafter, is a second embodiment comprising the disk shown in FIGS. 6 through 10. The disk 72 generally comprises a hollow body in the shape of a truncated right circular cone. The disk structure includes a top wall 74 sloping downwardly and outwardly from the top edge of a generally cylindrical inner wall 76 which defines an axial centerbore 78 through the disk. A planar base wall 80 extends perpendicularly outwardly from the lower marginal opening of the centerbore 78 to join the sloped top wall 74 in a shared circular peripheral edge 82. Intermediate the open ends of the cylindrical wall 76, an integral annular flange 84 projects radially into the centerbore 78. The projection of the flange 84 is such that its top surface 86 provides an annular seat for the annular bottom surface 42 of the flange 36 for supporting the head 34 within the centerbore 78.

The horizontal base 80 of the disk bears directly upon underlying fill F in the manner of a supporting pad which distributes downwardly directed loading received from the upper section 22 over a relatively large area thereby reducing the unit pressure acting to compress or displace the fill. The axial support for the upper section provided by base 80 is substantially greater than that provided by the aforedescribed annular shoulder 50 acting alone.

The sloping upper disk wall 74 integrally connects the upper marginal opening of the vertical counterbore wall 76 to the disk's outer circumferential edge 82 to form a conical surface having a relatively low vertical profile or aspect. The slope of the wall 74 can be varied as desired by changing the outer diameter of the base 80 or the vertical dimension of the disk's inner cylindrical wall 76. One function of the sloped disk wall 74 is to deflect or shed water away from the exposed upper end of the housing 20 and to conduct such water to the outer edge 82 of the disk where it enters that portion of the fill F radially beyond the adjacent fill underlying the base 80. The disk edge 82 may have a depending continuation in the form of an annular skirt 88 having an axial dimension sufficient to limit seepage of deflected water back into the fill underlying the base 80. The skirt 88 additionally serves to provide lateral stability for the layer of fill F directly underlying and supporting the disk base 80.

While the disk could comprise a solid body, the perferred embodiment shown in FIG. 2 has a hollow interior space 88 defined by the aforenoted cylindrical wall 76, the sloped wall 74 and the flat base 80. A hollow disk has less weight acting downwardly upon the fill underlying the disk; and, other beneficial aspects of a hollow disk will become apparent hereafter.

When the disk 72 is fully assembled to the upper section 22 of the housing 20, as shown in FIGS. 2 and 3, the flange surface 42 bears upon the underlying disk flange surface 86; and, an annular clearance space between the flange surface 40 and the disk's centerbore wall 78 extends vertically between the top surface 38 of the head 34 and surface 86. Since it is desirable that such clearance be made great enough to permit assembly of the disk 72 to the section 22 in the field without special tools or methods, it is unavoidable that some water will enter this annular passage. To forestall the possibilty that such leakage will find its way through this clearance space into the fill under the disk, several angularly spaced apertures 90 extend radially through the cylindrical wall 76 to connect the aforenoted clearance space with the hollow interior 88 of the disk. Preferably these apertures slope downwardly from the clearance space into the disk interior with their upstream openings in substantial vertical alignment with the annular surface 86. Any significant quantity of water passing through apertures 90 and accumulating in the disk's interior 88 is then drained through several angularly spaced apertures 92 through the disk base 80. In order that drainage from the disk interior be received in the fill F under the base 80 at the least detrimental point, the apertures 92 are spaced proximate the outer periphery of base 80 and remote from the cylindrical inner wall 76 of the disk 72. From the foregoing detailed description, it will be appreciated that an advantageous structural feature of the disk is the provision of a fluid passage comprising aperture 90, disk interior 88 and aperture 92 to obviate deleterous effects of water entering between the upper section 22 and the disk.

The aforedescribed prior art valve housing 20 is typical of those used in connection with gas shut-off valves located beneath parkways or lawns adjacent residential structures; and, the method of installing such a housing is well understood. The principal objects of this invention are realized by mounting the disklike support 72 adjacent the top of such a prior art housing. Whether the disk 72 is put in place in connection with the initial installation of a valve housing or as a modification of a previously installed upper housing section 22 excavated to raise it from a sunken condition, the assembled upper housing member and disk 72 will be supported relative to the surrounding ground surface G, substantially as shown in FIG. 2, by underlying fill F. The upper end surface 38 of the head 34, the upper surface 54 of the lid 52, and a significant portion of the adjacent disk wall 74 should remain exposed, i.e., visible above ground level G. The extent to which the disk wall 74 projects above ground is variable between total exposure and none at all depending upon such factors as the diameter and slope of the disk wall 74, the expected depth and density of vegetative growth and debris on the ground, the maximum allowable vertical projection of the head 34 and lid 52 above ground level G, and whether the projecting disk's appearance is acceptable from an esthetic veiwpoint.

The outer diameter of the disk 72, hence the surface area of the disk's bottom wall 80 supportively bearing upon underlying fill F, may vary and will depend on such factors as the weight of the upper housing section 22 to be supported, the moisture content of the fill and its compactability at the time of initial installation, and the anticipated frequency and quantity of rain, snow melt, lawn sprinkling, etc. on and around the disk. The presence of soil and water conditions conducive to instability of the fill F would indicate, for example, that a disk having a greater diameter and perhaps a longer skirt 88 than shown in FIG. 2, should be installed about the upper section 22.

The following structural adjuncts of this invention greatly facilitate the installation of a valve housing penetrating the disclosed support disk 72. To secure the upper housing section 22 and the disk 72 to one another so that the disk is held from sliding down and interfering with placement and compaction of fill under the disk base 80, bent clips 94 shown in FIGS. 1 and 3, may be inserted in one or more apertures axially penetrating the cylindrical inner wall 76 of the disk 72. The lower end 96 of the clip is bent radially outwardly under the base 80; and, the upper end 98 of the clip is bent radially inwardly to overlie the upper surface 38 of the head 34. The clip cross section may be rectangular, as shown, or otherwise as desired provided only that the configuration and material selected for the clip provide adequate strength to resist unintended disassembly of upper section 22 and disk. The clips 94 may be left in place after fill is firmed in place; however, it is preferable that the upper clip end 98 be removed so that incidental forces acting downwardly upon the disk wall 74 will not be coupled to the upper section 22.

Another feature of this invention facilitating its proper installation is the provision of the depth indicating rings 99 raised on the upper surface of disk wall 74. Where some portion of the wall 74 is buried below ground level G, as shown in FIG. 2, the radially spaced rings 99 provide ready visual indication as to whether the disk is located at a prescribed depth and whether the disk is supported by the underlying fill in a generally horizontal attitude.

If the terrain surrounding the upper housing section 22 is unavoidably sloped, the wedging annulus 100, shown in FIGS. 4 and 5, may be placed about the head 34 to tilt the disk 72 so that it lies parallel with the surrounding ground surface yet supports the upper section vertically. This annular member should be made of metal, hard plastic or similarly hard, durable material. The axial dimension of the cylindrical wall 102 varies with the thickest protion of the wall underlying the downhill side of the flange 36.

Another structural embodiment of the present invention is illustrated in FIGS. 6 through 10 where numeral 104 generally denotes a modified two-piece disk construction. Disk 104 comprises an upper element 106 and a lower element 108 which are coaxially assembled by means of interfitting projections and depressions provided by these elements. FIG. 6 shows that the upper disk element 106 exhibits a conical wall 110 having a depending annular skirt 112 and a centerbore 114 defined by a cylindrical wall 116. The lower element 108 includes an axial centerbore 118 defined by a cylindrical wall 120. A depending cylindrical wall 122 partially coaxially surrounds the wall 120 and is joined thereto by an annular web 124 having flat top surface 126 joined to a beveled surface 128. A planar circular base 130 has a central opening joined to the cylindrical wall 120 and a skirt 132 depending from its outer perimeter.

From FIG. 6 it will be understood that the lower disk element 108 fits coaxially inside the upper disk element 106 with their respective cylindrical walls 116 and 122 and their respective skirts 112 and 132 adjacent one another. A plurality of angularly spaced, hemisperical projections 134 extend radially from and about the cylindrical wall 122 and annular skirt 132 of the lower disk element. As best shown in Figs. 7; 9 and 10, these projections are received in similarly shaped and spaced depressions 136 recessed in the cylindrical wall 116 and the annular skirt 112.

When the upper and lower elements of the two-piece disk 104 are joined by the interfitting projections 134 and recesses 136, this embodiment of the invention coacts with the head 34 of an upper housing section 22 to support the same in a manner similar to the unitary disk 72 described earlier. The annular bottom surface 42 of the head flange 36 is seated upon the annular top surface 126 of the web 124. Water entering the clearance space between the cylindrical wall 40 of the flange 36 and the cylindrical wall 116 of the disk centerbore 114 will seep down through the arcuate interstices between the walls 116 and 122, into the hollow interior 140 of the disk 104, and then through the arcuate interstices between the skirts 112 and 132. The beveled surface 128 prevents seepage from passing between the surfaces 42 and 126 into the centerbore 118 of the lower disk element 108.

The provision of hollow interiors 88 and 140 for the disks 72 and 104, respectively, not only reduces disk weight and communicates leakage water directly through the disks, but also permits the sloped upper walls of these disks to flex inwardly or downwardly. Such movement tends to cushion impacting of the disks by foot traffic or by wheeled lawn care devices. This absorption of impact forces coupled with the generous bearing surface of the bottoms 80 and 130, respectively, of the disks reduces undesirable compaction and consequent downward movement of fill under the disks. The choice of a flexible material for the two-piece disk 104 not only provides flexure of its sloped disk wall 110 but also provides resilient, snap-acting means for connecting the upper and lower disk elements 106 and 108 of the two-piece embodiment shown in FIG. 6.

While the advantages provided by making the disk interiors hollow are substantial, there is a risk that these cavities could provide unwanted disk bouyancy if the underlying fill were to become saturated with water or if the disks were to be submerged during a flood. This potential problem has been nicely obviated by the drain apertures in disk bottom 80 and the intersticial spaces between the skirts 112 and 132 which will freely admit water into the cavities 88 and 140, respectively, to reduce or eliminate disk bouyancy tending to pull the upper housing section 22 out of the ground.

Preferably the disks 72 and 104 described above are made of weather resistant, yet light weight and flexible plastic material. A non-rusting metal such as aluminum or magnesium could be employed; however, the resilience and flexability of these and other metals are less than that provided by certain well known plastic materials. It is also possible to make the disk of a plastic which is brightly colored or which exhibits iridescense or luminescense to render the exposed portion of the disk more readily visible.

The invention has been disclosed as both a single-piece construction and a two-piece construction. While both constructions serve the same purpose and function in substantially the same manner, the two-piece embodiment may be somewhat simpler to manufacture.

The foregoing description of the embodiments of the invention shown in the drawings is illustrative and explanatory only; and, various changes in size, shape and materials, as well as in specific details of the illustrated construction may be made without departing from the scope of the invention. Therefore, I do not intend to be limited to the details shown and described herein, but intend to cover all changes and modifications which are encompassed by the scope and spirit of the appended claims.

What I claim as my invention is:

1. A support for a tubular section of an underground valve housing, said support having:
   a generally flat bottom wall;
   a conical top wall joined to said bottom wall;
   a tubular wall joined at opposite ends to said top and bottom walls;
   an inner cylindrical surface of said tubular wall defining an axial bore through said support;
   an outer cylindrical surface of said tubular wall coacting with said top wall and said bottom wall to define a hollow chamber in said support; and,
   a support surface projecting from said tubular wall into said bore to support said tubular section.

2. The invention disclosed in claim 1, wherein:
   at least one of said bottom and said top walls is flexible.

3. The invention disclosed in claim 1, wherein:
   said support has a circular outer marginal edge from which a skirt depends.

4. The invention disclosed in claim 1, wherein:
   an annular water leakage passage defined between said support and said tubular section is drained by a first opening connecting said passage to the hollow chamber in of said support and a second opening communicating leakage age from said chamber.

5. The invention disclosed in claim 4, wherein:
   said first opening comprises an aperture slanted with respect to said leakage passage and opening from said leakage passage in general alignment with said surface.

6. The invention disclosed in claim 1, wherein:
   said conical wall has on its surface at least one indicator ring concentric with and radially spaced from the outer marginal edge of said conical wall.

7. The invention disclosed in claim 1, wherein:
   said support comprises first and second unitary elements;
   said first element comprises said bottom wall and a lower portion of said tubular wall;
   said second element comprises said top wall and an upper portion of said tubular wall; and,
   said elements are coaxially joined by interfitting means formed on said elements.

8. The invention disclosed in claim 7, wherein:
   said bottom wall and said top wall have annular skirts depending therefrom;
   and said interfitting means are formed on said upper and lower portions of said tubular wall and on said annular skirts.

9. The invention disclosed in claim 1, together with:
   a discrete annular wedge disposed about said tubular section and between said tubular section and said support surface whereby said tubular section and said bore are axially misaligned.

10. The invention disclosed in claim 1, together with:
    clip means penetrating said tubular wall and engaging said tubular section to prevent relative axial movement between said support and said tubular section.

* * * * *